US008898435B2

(12) United States Patent
Merchant et al.

(10) Patent No.: US 8,898,435 B2
(45) Date of Patent: *Nov. 25, 2014

(54) OPTIMIZING SYSTEM THROUGHPUT BY AUTOMATICALLY ALTERING THREAD CO-EXECUTION BASED ON OPERATING SYSTEM DIRECTIVES

(71) Applicant: International Business Machines Corporation, Armonk, NY (US)

(72) Inventors: Amit Merchant, Bangalore (IN); Dipankar Sarma, Bangalore (IN); Vaidyanathan Srinivasan, Bangalore (IN)

(73) Assignee: Lenovo Enterprise Solutions (Singapore) Pte. Ltd. (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/093,340

(22) Filed: Nov. 29, 2013

(65) Prior Publication Data
US 2014/0089637 A1    Mar. 27, 2014

Related U.S. Application Data

(63) Continuation of application No. 13/294,244, filed on Nov. 11, 2011.

(51) Int. Cl.
*G06F 9/52*      (2006.01)
*G06F 11/34*     (2006.01)
*G06F 9/38*      (2006.01)

(52) U.S. Cl.
CPC ........ *G06F 9/3851* (2013.01); *G06F 2201/865* (2013.01); *G06F 9/52* (2013.01); *G06F 11/3466* (2013.01); *G06F 11/3409* (2013.01)
USPC ........................................ 712/205

(58) Field of Classification Search
CPC combination set(s) only.
See application file for complete search history.

(56) References Cited

U.S. PATENT DOCUMENTS

| 7,469,407 B2 * | 12/2008 | Burky et al. ................ 718/104 |
| 2001/0056456 A1 | 12/2001 | Cota-Robles |
| 2006/0064695 A1 | 3/2006 | Burns et al. |
| 2006/0179281 A1 | 8/2006 | Jensen et al. |

(Continued)

FOREIGN PATENT DOCUMENTS

JP       406230963 A  *  8/1994  ............... G06F 9/38

OTHER PUBLICATIONS

Luo,Kun etal., Balancing Throughput and Fairness in SMT Processors, 2001, IEEE pp. 164-171.*

(Continued)

*Primary Examiner* — Eric Coleman
(74) *Attorney, Agent, or Firm* — Walter W. Duft (57) ABSTRACT

A technique for optimizing program instruction execution throughput in a central processing unit core (CPU). The CPU implements a simultaneous multithreading (SMT) operational mode wherein program instructions associated with at least two software threads are executed in parallel as hardware threads while sharing one or more hardware resources used by the CPU, such as cache memory, translation lookaside buffers, functional execution units, etc. As part of the SMT mode, the CPU implements an autothread (AT) operational mode. During the AT operational mode, a determination is made whether there is a resource conflict between the hardware threads that undermines instruction execution throughput. If a resource conflict is detected, the CPU adjusts the relative instruction execution rates of the hardware threads based on relative priorities of the software threads.

7 Claims, 4 Drawing Sheets

(56) References Cited

U.S. PATENT DOCUMENTS

| | | | | |
|---|---|---|---|---|
| 2008/0059712 | A1* | 3/2008 | Fedorova | 711/130 |
| 2008/0163230 | A1* | 7/2008 | Latorre et al. | 718/104 |
| 2009/0172315 | A1 | 7/2009 | Iyer et al. | |
| 2009/0328055 | A1* | 12/2009 | Bose et al. | 718/105 |
| 2011/0055479 | A1 | 3/2011 | West et al. | |

OTHER PUBLICATIONS

Cazorla, Francisco J. etal., Dynamically Controlled Resource Allocation in SMT Processors, IEEE, 2004, 12 pages.*

J. Oplinger et al., "Enhancing Software Reliability with Speculative Threads", downloaded from <http://suif.stanford.edu/~jeffop/paper/oplinger_asplos02.pdf>, 2002, 13 pages.

E. Ebrahimi et al., "Fairness via Source Throttling: A Configurable and High-Performance Fairness Substrate for Multi-Core Memory Systems", downloaded from <http://www.ece.cmu.edu/~omutlu/pub/fst_asplos10.pdf>, ASPLOS '10, Mar. 13-17, 2010, 12 pages.

S. Fiske et al., "Thread Prioritization: A Thread Scheduling Mechanism for Multiple-Context Parallel Processors", downloaded from <http://dx.doi.org/10.1109/HPCA.1995.386541>, Proceedings of the First International Symposium on HPCA, Jan. 1995, 12 pages.

B. Rao et al., "Optimal Task Placement on MC Systems Using Performance Counters", Jan. 2010, 34 pages.

A. Snavely et al., "Symbiotic Jobscheduling for a Simultaneous Multithreading Processor", Proceedings of ASPLOS IX, Nov. 2000, 11 pages.

F. J. Cazorla et al., "Predictable Performance in SMT Processors: Synergy between the OS and SMTs", IEEE Transactions on Computers, vol. 55, No. 7, Jul. 2006, pp. 785-799.

A. Settle et al., "Architectural Support for Enhanced SMT Job Scheduling", 13th International Conference on Parallel Architectures and Compilation Techniques (PACT'04), 2004, 11 pages.

A. Weinberg et al., "User-Guided Symbiotic Space-Sharing of Real Workloads", Proceedings of the 20th Annual International Conference on Supercomputing, Jun. 28-30, 2006, 8 pages.

M. K. Qureshi, "Utility-Based Cache Partitioning: A Low-Overhead, High-Performance, Runtime Mechanism to Partition Shared Caches", Proceedings of the 39th Annual IEEE/ACM International Symposium on Microarchitecture, Dec. 9-13, 2006, 10 pages.

S. Parekh, "Thread-Sensitive Scheduling for SMT Processors", 2000, 18 pages.

* cited by examiner

OPTIMIZING SYSTEM THROUGHPUT BY AUTOMATICALLY ALTERING THREAD CO-EXECUTION BASED ON OPERATING SYSTEM DIRECTIVES

This application is a continuation under 35 U.S.C. 120 of application Ser. No. 13/294,244, filed Nov. 11, 2011, entitled "Optimizing System Throughput by Automatically Altering Thread Co-Execution Based On Operating System Directives."

BACKGROUND

1. Field

The present disclosure relates to simultaneous multithreading in which software tasks execute simultaneously by mapping them to pre-existing hardware threads of a central processing unit (CPU). More particularly, the disclosure concerns the monitoring and control of a CPU's hardware multithreading mode to minimize thread resource conflicts.

2. Description of the Prior Art

By way of background, many modern CPUs can process the instructions of two or more software tasks (e.g., threads of execution) simultaneously. This is known as simultaneous multithreading or SMT. SMT is supported by scheduling software threads that are managed by an operating system (OS), hypervisor or other thread scheduling entity to run on pre-existing hardware threads that are managed by the CPU. Hardware threads are independent instruction streams that execute in parallel while sharing resources within the CPU. Usually, the software that schedules software threads for execution on the CPU can set the number of hardware threads that are active at any given time. Each hardware thread can be exposed to the scheduling software as a logical CPU on which the software threads can be assigned to run. Given that the hardware threads are treated as logical CPUs, the scheduling software needs to perform hardware thread management housekeeping work—from interrupt handling to organizing and assigning the software threads to run on the active hardware threads. The process of switching hardware threads also requires software involvement and can be slow (e.g., running into 10s of milliseconds).

While the general goal of SMT is to maximize the instruction execution throughput of all software threads through parallel execution in as many hardware threads as possible within a CPU core, the scheduling software cannot easily decide whether it is more efficient to schedule the software threads for serial execution or simultaneously in parallel. The advantage of scheduling them simultaneously is that CPU hardware resources can be shared by all threads. Cache memory is one example. When software threads execute simultaneously as hardware threads, instructions that miss the CPU's onboard cache(s) can be overlapped, and thus net latency for executing the instructions can be reduced. However, when CPU cache(s) hold working sets for several software threads executing as hardware threads in SMT mode, each thread has a smaller available effective cache. If the software threads operate on a significant amount of data, the CPU cache(s) may not hold each thread's entire working set and the CPU may spend time swapping data into and out of the cache(s). This can make SMT ineffective because the CPU may spend an inordinate amount of time moving data and managing cache operations. Similar resource conflicts may arise with respect to other CPU hardware resources, such as translation lookaside buffers (TLBs), functional execution units, etc.

Unfortunately, such resource conflicts may be hard to identify and address in software. In the case of cache conflicts, although scheduling software could attempt to monitor cache thrashing activity, the software would have difficulty determining whether conflicts are being caused by normal software thread operations or hardware thread competition for cache resources. Evaluating the effectiveness of SMT operations to ensure maximum thread instruction execution throughput is thus somewhat difficult. Moreover, software workloads are typically dynamic in nature and may require rapid adjustment of SMT modes. Unfortunately, switching between SMT modes is often too slow to accurately track dynamic resource conflict scenarios that arise in the CPU. The present disclosure addresses these concerns and provides a novel SMT technique that accurately tracks dynamic resource conflicts between software threads and automatically sets SMT modes to optimize thread instruction execution throughput.

SUMMARY

A method, apparatus and system optimize program instruction execution throughput in a central processing unit core (CPU). The CPU implements a simultaneous multi-threaded (SMT) operational mode wherein program instructions associated with at least two software threads are executed in parallel as hardware threads while sharing one or more hardware resources used by the CPU, such as cache memory, translation lookaside buffers, functional execution units, etc. As part of the SMT mode, the CPU implements an autothread (AT) operational mode. During the AT mode, a determination is made whether there is a resource conflict between the hardware threads that undermines instruction execution throughput. If a resource conflict is detected, the CPU adjusts the relative instruction execution rates of the hardware threads based on relative priorities of the software threads. Advantageously, the instruction rate adjustment is performed on a very fast time scale in comparison to software-based SMT mode switching.

In an example embodiment dealing with cache conflicts, the resource conflict determination may comprise determining whether a cache eviction rate of a cache memory resource exceeds a cache eviction rate threshold, and whether an instruction retiral rate of the hardware threads is below an instruction retiral rate threshold. The resource conflict determination may be performed periodically at a predetermined interval. The instruction execution rate adjustment may comprise throttling an instruction fetch rate of one or more lower priority threads. If the instruction execution rate adjustment does not improve an instruction retiral rate of one or more of the threads, the instruction execution rate may be readjusted. The AT mode may be implemented when the CPU is executing in application thread context and may be exited when the CPU is executing in a non-application thread context, such as during interrupt handling or bottom half context. The AT mode may further include logging an amount of time that the software threads are allowed to execute for use in subsequent software scheduling of the software threads by an operating system, hypervisor or other thread scheduling entity.

BRIEF DESCRIPTION OF THE DRAWINGS

The foregoing and other features and advantages will be apparent from the following more particular description of an example embodiment, as illustrated in the accompanying Drawings, in which.

DETAILED DESCRIPTION OF EXAMPLE EMBODIMENTS

Introduction

The present disclosure presents a new mode of execution of program instructions within a central processing unit (CPU) that implements simultaneous multithreading (SMT). The new CPU operational mode may be called "AutoThread" or "AT." In the AT mode, the CPU takes a software directive from a thread scheduling entity, such as an operating system (OS) or a hypervisor. The software directive indicates the relative priorities of the software threads that are assigned to the CPU to run as SMT hardware threads. These priorities may be loaded by the software program as part of context switches or other events that result in software thread rescheduling. Insofar as the SMT hardware thread entities serve as logical vehicles for executing the software threads, the hardware threads may be thought of as assuming the priorities of their associated software threads. Moreover, because the software threads are scheduled to run within hardware threads while executing in SMT mode, the context in which the term "software thread" is used within the present discussion will often be synonymous with the term "hardware thread," and visa versa.

The CPU monitors resource conflicts caused by hardware thread processing operations, and if necessary, dynamically adjusts the relative instruction execution rates of the hardware threads based on the relative priorities of the software threads. This can be done by proportionately throttling instruction fetching within one or more lower priority hardware threads in favor of one or more higher priority threads. In an example embodiment, a state machine within the CPU is used to implement the foregoing logic. The state machine evaluates contention for one or more hardware resources, such as cache memory, translation lookaside buffers, functional execution units, etc., and also monitors instruction retiral rates to decide whether one or more hardware threads need to be throttled in order to maximize the system throughput of the CPU as prioritized in the software threads. In the case of cache memory, as various hardware threads co-execute, the CPU's cache(s) will be loaded with each thread's working data set. Cache misses will result when a thread's data is not found in the cache. This will generate cache evictions as the least recently used data is evicted in favor of new data fetched from main memory. The state machine may thus monitor cache evictions and use such information as a measure of cache resource conflicts caused by simultaneous thread execution.

The state machine may take into account the instruction retiral rate of the executing hardware threads as a measure of instruction execution throughput. If the number of evictions per unit time (or as a proxy per "n" instructions completed) exceeds a preloaded threshold, and if the instruction retiral rate falls below a threshold value, the state machine may deem that the hardware threads are interfering with each other in contending for hardware resources (e.g., the cache(s)) and therefore slowing down all of the threads. When this occurs, the state machine may inspect software-loaded thread priority values and throttles instructions from one or more deprioritized threads while allowing the instructions from one or more prioritized threads to proceed without abatement. This method allows complete stalling of one or more lower priority threads if necessary in order to achieve maximum instruction execution throughput for higher priority threads, in effect resulting in a transparent SMT mode switch but at a much faster time scale than software-based SMT mode switching. For example, the time scale for CPU-implemented instruction rate throttling as described herein may be on the order of 10s of microseconds, or less. Software-based SMT mode switches may take 10s of milliseconds. Advantageously, the operating system, hypervisor or other scheduling software is unaware of this fine-grained SMT mode switching and continues to see the hardware threads as schedulable entities. Following throttling, the state machine may continue to monitor the instruction retiral rate of the executing thread(s). If the instruction retiral rate does not sufficiently increase, the state machine may deem that increasing the effective hardware resource allocation (e.g., cache size) for the prioritized thread(s) was not useful. The state machine may then restore the status quo and allow all threads to resume executing simultaneously without throttling.

In order to avoid issues with housekeeping in the software environment, an example embodiment of the new AT mode may be implemented to operate only when the CPU is executing instructions in application thread context. When a hardware thread receives an interrupt and executes interrupt handlers or other non-application thread context code, it may be allowed to execute instructions in accordance with the normal SMT mode without interference from the AT mode. In an example embodiment, the state machine may log the amount of time each hardware thread is allowed to execute. A software scheduler may then consult this information for use in making future scheduling decisions.

Example Embodiment

Figure 1:
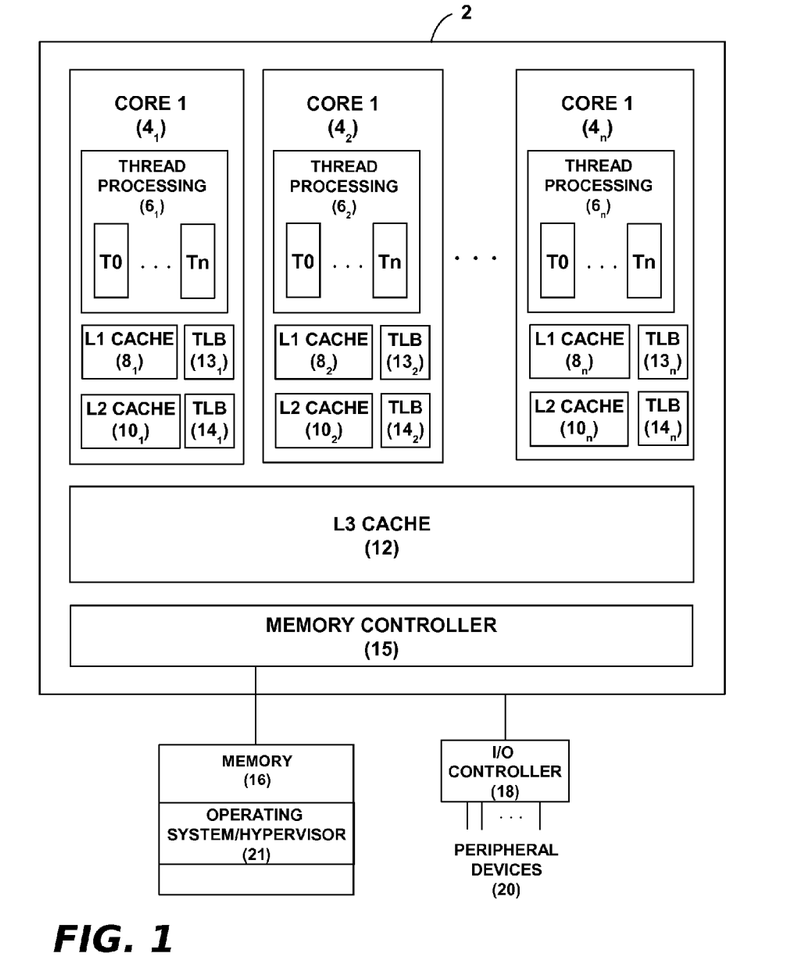
FIG. 1 is a functional block diagram showing an example computer system and processor apparatus that may be constructed in accordance with the present disclosure.

Turning now to the drawing figures, FIG. 1 illustrates an example processor apparatus 2 that is configured to support the AT (autothread) mode described herein as part of its SMT (simultaneous multithreading) processing operations. The processor 2 is an integrated circuit device that may be implemented as a microprocessor or as any other type of instruction processing apparatus, such as, without limitation, a general purpose processor, a micro-controller, a signal processor, etc. The processor 2 incorporates one or more central processing unit cores 4, each of which will be referred to hereinafter referred to as a "CPU." In FIG. 1, there are "n" CPUs 4 in the processor 2 that are identified by reference numbers $4_1, 4_2 \ldots 4_n$. Each CPU 4 includes a thread execution unit 6, and may further include one or more cache memories, such as an L1 (level 1) cache 8 and an L2 (level 2) cache 10. The processor 2 may further include an L3 cache 12. In FIG. 1, the processor 2 is shown with "n" thread execution units $6_1, 6_2 \ldots 6_n$, "n" L1 caches $8_1, 8_2 \ldots 8_n$, and "n" L2 caches $10_1, 10_2 \ldots 10_n$ in correspondence with the "n" CPUs $4_1, 4_2 \ldots 4_n$. The L3 cache 12 is a single cache that is shared by all of the CPUs 4. Alternative architectures could also be used, including a configuration in which a single L2 cache 10 is shared by all of the CPUs 4 in lieu of the L3 cache 12. Each CPU 4 also includes one or more translation lookaside buffers (TLBs) for caching virtual address/real address mappings. By way of example, one or more level-one TLBs 13 may be provided for each L1 cache 8 one or more level-two TLBs 14 may be provided for each L2 cache 10. FIG. 1 illustrates one possible arrangement wherein the the "n" CPUs $4_1, 4_2 \ldots 4_n$ have "n" level-one TLBs $13_1, 13_2 \ldots 13_n$ and "n" level-two TLBs $14_1, 14_2 \ldots 14_n$.

As further shown in FIG. 1, the processor 2 may include a memory controller 15 that is operatively coupled to a memory 16. The processor 2 may also have an I/O (input/output) controller 18 that is operatively coupled to one or more peripheral devices 20. The memory 16 may be used to store software thread scheduling program logic 21 that operates in conjunction with the processor 2 to implement the latter's AT mode operations. In an example embodiment, the program logic 21 may comprise an operating system, a hypervisor (also known as a virtual machine manager or VMM) and/or other scheduling program logic that implements a software thread scheduling function. The peripheral devices 20 could include, but are not limited to, peripheral storage devices, user interface output devices, user interface input devices, network adapters, etc.

The memory 16 may be implemented using any type of computer readable storage media capable of storing program instructions and data utilized by the CPUs 4 during instruction execution operations. Such media are typically referred to as primary storage. Examples include, but are not limited to, static or dynamic random-access memory, semiconductor read-only or flash memory, magnetic or optical disk memory, or combinations thereof. It will be appreciated that the memory 16 may be dedicated to the processor 2 or shared with other processing devices of like construction (not shown). The memory 16 may be proximate to the processor or could be situated remotely therefrom (e.g., as in a distributed NUMA system, a cluster, a cloud, etc.).

In FIG. 1, the memory controller 15 is integrated into the processor 2 while the I/O controller 18 is external to the processor die and packaging. In an alternative embodiment, the memory controller 15 could be implemented in conjunction with the I/O (Input/Output) controller 18 in a chipset that is external to the processor 2. In a further alternative embodiment, both the memory 16 and the I/O controller 18 could be integrated into the processor 2.

Figure 2:
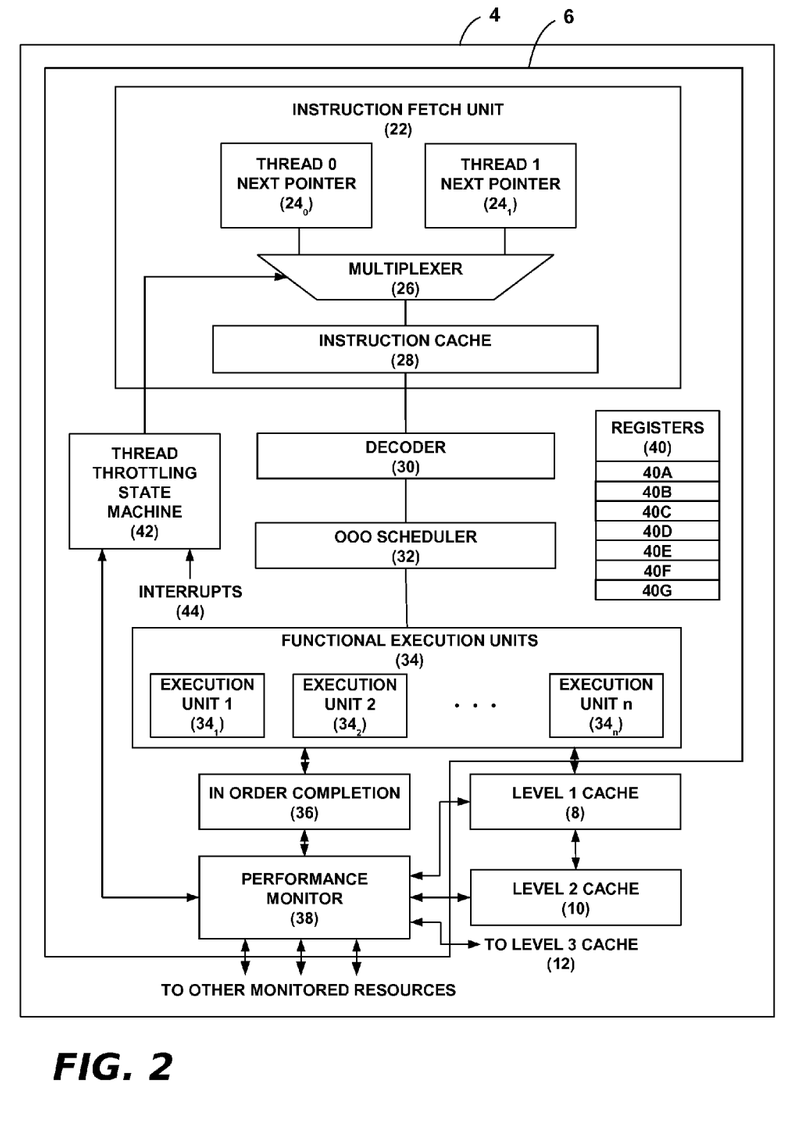
FIG. 2 is a functional block diagram showing an example central processing unit core (CPU) of the processor apparatus shown in FIG. 1.

In combination, the processor 4 (including the CPUs $4_1, 4_2 \ldots 4_n$, the L3 cache 12 and the memory controller 15), the memory 16, the I/O controller 18, and the peripheral devices 20 provide a fully operational data processing system. Such a system may be adapted for various end uses, including as a general purpose computer, a special purpose computer, a portable computing device, a communication device, a multimedia or audio presentation device, a set-top device, an embedded system, a dedicated logic or control system, to name but a few. The data processing system may also include other components beyond what is shown in FIG. 2. Such components will not be described in the interest of brevity and in order not to obscure the disclosed subject matter.

Turning now to FIG. 2, an example architecture that may be used to construct the thread execution unit 6 of each CPU 4 is shown. In the illustrated embodiment, the CPUs comprise a superscaler pipelined architecture in which hardware thread instructions proceed through multiple stages of an instruction pipeline, including an execution stage implemented by plural functional execution units operating in parallel. The CPU 4 also has the ability to implement at least an SMT-2 mode of operation wherein two hardware threads execute simultaneously. Additional SMT modes (such as SMT-4) could also be supported.

An instruction fetch unit 22 is adapted to fetch hardware thread instructions for decoding and execution. In FIG. 2, the instruction fetch unit 22 is shown to have two program counters $24_0$ and $24_1$ that support the simultaneous execution of two hardware threads in SMT-2 mode. These program counters are respectively designated as the "Thread 0 Next Pointer" and the "Thread 1 Next Pointer." It will be appreciated that additional program counters may be used to implement higher order SMT modes (such as SMT-4) for simultaneously processing additional hardware threads. Each of the program counters $24_0$ and $24_1$ stores the address of the next instruction be processed for the respective software threads that are scheduled to run within hardware threads on the CPU 4. The instruction fetch unit 22 further includes a programmable multiplexer 26 and an instruction cache 28 that represents a portion of the L1 cache 8 shown in FIG. 1. The multiplexer 26 receives as inputs the addresses stored by the program counters $24_0$ and $24_1$, and selectively determines the addresses of the next hardware thread instructions to be fetched from the instruction cache 28. As the hardware instructions are fetched from the instruction cache 28, they are input to a decoder 30 that represents the next stage in the instruction pipeline. From the decoder 30, the hardware instructions advance to an OOO (out-of-order) scheduler 32 that will be present if the CPU 4 supports out-of-order instruction execution. Alternatively, the CPU 4 could be implemented as an in-order instruction processing device. Following the OOO scheduler 32, or the decoder 30 if out-of-order instruction execution is not supported, the hardware instructions advance to a set of functional execution units $34_1 \ldots 34_n$ that may include an integer unit, a floating point unit, a memory load/store unit, and other well-known execution functions. Downstream of the execution units 34 is an in-order completion unit 36 that attempts to retire instructions and commit their results to the memory 16 in program order. The operations of the decoder 30, the OOO scheduler 32, the execution units 34 and the in-order completion unit 36 are conventional in nature. Details of their operations will not be further described herein in the interest of brevity and so as not to obscure the disclosed subject matter.

With continuing reference to FIG. 2, the CPU 4 additionally includes a performance monitor 38, a set of registers 40, and a thread throttling state machine 42 whose inputs may include hardware and software interrupts 44. These components allow the CPU 4 to implement the AT operational mode disclosed herein. Briefly, the function of the performance monitor 38 is to monitor instruction retinal rates and hardware resource conflicts (e.g., cache evictions, TLB evictions, functional execution unit contention, etc.). The function of the registers 40 is to maintain AT mode control and logging data, and the function of the state machine 42 is to implement hardware thread instruction fetch rate throttling when appropriate.

The performance monitor 38 comprises hardware circuitry and/or programmable logic (e.g., microcode) that may be located in the thread processing unit 6 of the CPU 4. As a measure of instruction execution throughput, it monitors instruction retiral rates by tracking the instruction retirement events occurring in the in-order completion unit 36. It also monitors conflicts between one or more CPU hardware resources. By way of example, the performance monitor 38 may monitor cache eviction events occurring in one or more of the L1, L2 and L3 caches 8, 10 and 12. As also shown in FIG. 2, the performance monitor can monitor other hardware resources, including but not limited to TLB evictions, thread contention for the functional execution units 34, etc. Any suitable techniques may be used to accomplish the forgoing monitoring. In an example embodiment, the performance monitor 38 tracks the sum of the retiral rates of all hardware threads running on the CPU 4. Cache evictions can be monitored in a similar manner, namely, as the sum of the cache evictions produced by all hardware threads running on the CPU 4. TLB evictions may likewise be monitored in this manner. Functional execution unit contention can be monitored by evaluating the allocation of the various functional execution units 34 to the instructions of each thread. In other embodiments, it may be desirable for the performance monitor 38 to track the retiral rates of individual hardware threads in order to provide more fine-grained monitoring. The instruction retiral and hardware resource conflict information collected by the performance monitor 38 is periodically provided to the state machine 42 for processing. The manner in which the state machine evaluates the monitored information is described in more detail below in connection with FIG. 3, which describes an example based cache conflict monitoring.

The registers 40 are used to store various information that the state machine 42 uses to control AT mode operations and to log information that may be relevant to an operating system, hypervisor or other thread scheduling entity. A first set of thread priority registers 40A is used by the operating system, hypervisor or other thread scheduling entity to advise the CPU 4 of software thread priorities. One thread priority register 40A may be used for each software thread that is currently scheduled to run on a hardware thread of the CPU 4. Thus, two such registers may be used for SMT-2 mode, and four registers may be used for SMT-4 mode, and so on. In FIG. 2, there are two thread priority registers 40A because FIG. 2 illustrates an embodiment in which two software threads are scheduled to run within two hardware threads running in SMT-2 mode.

A second set of thread utilization logging registers 40B are used by the CPU 4 to log hardware thread utilization accounting information. For example, the thread utilization logging registers 40B can maintain a count that reflects the amount of time that the scheduled software threads are allowed to execute. If a lower priority thread is being throttled due to AT mode operations, a corresponding thread utilization logging register 40B will reflect this condition. The operating system, hypervisor or other thread scheduling entity may use this accounting information for various purposes, such as to make future scheduling decisions, adjust software thread priorities, or to ensure that user accounting charges are fair (e.g., in fee-based server systems). One thread utilization logging register 40B may be used for each hardware thread. Thus, two such registers can be used for SMT-2 mode, and four registers can be used for SMT-4 mode, and so on. In FIG. 2, there are two thread utilization logging registers 40B because FIG. 2 illustrates an embodiment in which two software threads are scheduled to run within two hardware threads running in SMT-2 mode.

The next three registers 40C, 40D and 40E are reference registers that are programmed by an operating system, a hypervisor or other thread scheduling entity and used by the state machine 42 to make decisions regarding the adjustment of hardware thread instruction execution rates. Reference register 40C contains a hardware resource conflict reference value that the CPU 4 uses to compare against an actual hardware resource conflict level detected by the performance monitor 38 prior to instruction fetch rate throttling. For example, if cache contention is being monitored, the reference register 40C could store a cache eviction rate reference value that the CPU 4 uses to compare against the actual cache eviction rate. Additional reference registers 40C could be provided for other hardware resources being monitored by the performance monitor 38, such as TLB evictions, functional execution unit contention, etc. Reference registers 40D and 40E store reference values that indicate instruction execution throughput thresholds. Reference register 40D contains a first instruction retiral rate reference value that the CPU 4 uses to compare against an actual instruction retiral rate detected by the performance monitor 38 prior to instruction fetch rate throttling. Reference register 40E contains a second instruction retiral rate reference value that the CPU 4 uses to compare against an actual cache eviction rate detected by the performance monitor 38 after instruction fetch rate throttling.

The registers 40F and 40G store state machine wait period values. Wait period register 40F contains the number of clock cycles that the state machine 42 waits after entering the AT mode or resetting its state before making a first comparison of actual hardware resource conflicts and instruction retiral rates against the values stored in reference registers 40C and 40D. As described in more detail below, resetting the state of the AT mode refers to an operation that resets the hardware thread instruction rates back to their initial default values after a thread execution rate adjustment has been made, but is deemed to be unsuccessful. In an example embodiment, the value of wait period register 40F may be on the order of at least 100,000 clock cycles or several microseconds. Wait period register 40G contains the number of clock cycles that the state machine 42 waits before performing subsequent periodic sampling of the reference registers 40C and 40D after the AT mode state has been changed or maintained at its current level. Again, the AT mode state refers to the instruction execution rates of the hardware threads. As described in more detail below, the algorithm will either determine that the existing thread instruction execution rates need to change or can be maintained at their existing level. In an example embodiment, the value of wait period register 40G may be less than the value of wait period register 40F, depending on design preferences.

The state machine 42 comprises hardware circuitry and/or programmable logic (e.g., microcode) that may be located in the thread processing unit 6 of the CPU 4. It receives hardware conflict and instruction retinal rate information detected by the performance monitor 38 and compares such information against the reference values stored in reference registers 40C, 40D and 40E. Based on these comparisons, the state machine 42 makes instruction fetch rate throttling decisions. If instruction fetch rate throttling is warranted, the state machine 42 consults the thread priority registers 40A to ascertain the relative software thread priorities. The state machine 42 initiates instruction fetch rate throttling by sending control signals to the multiplexer 26 instructing it to lower the instruction fetch rate of one or more lower priority hardware threads. The number of lower priority threads to be throttled will depend on the SMT mode being used. In the example embodiment of FIG. 2 wherein the CPU 4 is in SMT-2 mode with two threads executing simultaneously (Thread 0 and Thread 1), there will be only one lower priority thread and one higher priority thread. If the CPU 4 is capable of operating in higher SMT modes (such as SMT-4), there may be four or more threads. In that case, there could be several lower priority threads whose instruction fetch rates might be throttled and one or more higher priority threads whose instruction fetch rates are not throttled.

Figure 3:
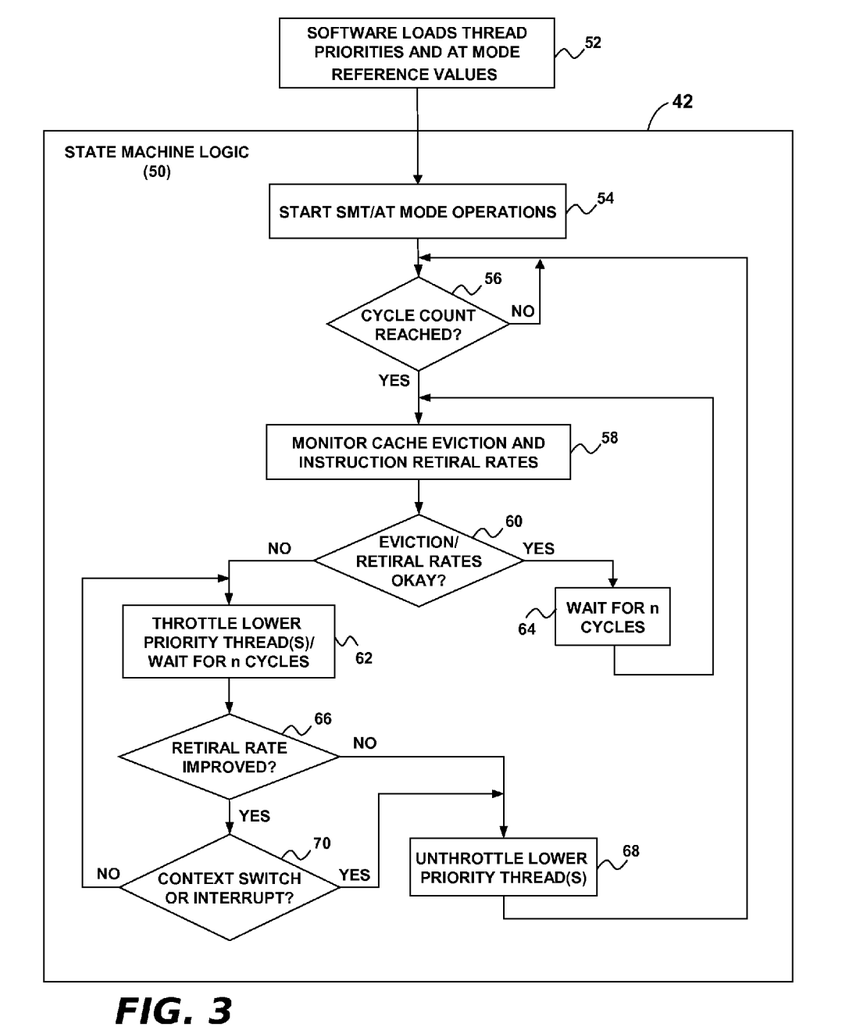
FIG. 3 is a flow diagram showing example machine logic that may be implemented by the CPU shown in FIG. 2.

FIG. 3 illustrates one possible sequence of operations that may be performed by the state machine 42 in an example embodiment wherein the hardware resource being monitored for conflicts is cache memory. It will be appreciated that these operations could be extended to include additional hardware resource conflicts if desired. Initially, in block 52, an operating system, hypervisor or other thread scheduling entity loads the thread priority registers 40A with the respective priorities of the software threads to be run by the CPU 4 as SMT hardware threads in AT mode. The operating system, hypervisor or other thread scheduling entity also loads the reference registers 40C, 40D and 40E if those registers have not been previously loaded or if existing reference values therein need to be changed. In block 54, the state machine logic starts SMT/AT mode operations in response to a directive from the operating system, hypervisor or other thread scheduling entity sets the CPU 4 to execute in SMT mode with AT mode support (e.g., by manipulating one or more control register bits (not shown)).

In block 56, the state machine 42 cycles until an initial wait period as specified in wait period register 40F has elapsed. As the hardware threads execute, their instructions will be retired by the in-order completion unit 36. Also, some of the hardware thread memory transactions will hit the L1, L2 and L3 caches 8, 10 and 12, while others will miss. Once the initial wait period specified in wait period register 40F concludes, the state machine 42 interacts with the performance monitor 38 in block 58 to monitor cache evictions in one or more of the L1, L2 and L3 caches 8, 10 and 12 caused by hardware thread execution and also the hardware thread instruction retiral rates. In an example embodiment, cache eviction rate monitoring may be determined by using a weighted sum of the cache evictions from each of the L1, L2 and L3 caches 8, 10 and 12 that are generated within a given time period (or as a proxy per "n" clock cycles completed). The weighting factors applied to each cache may be selected according to design preferences. For example, if it is believed that L3 cache evictions will be the most important parameter to consider, more weight can be given to the L3 cache 12 than the L1 and L2 caches 8 and 10. In other embodiments, cache evictions from only one or two of the caches might be considered. In an example embodiment, instruction retiral rates may be determined by measuring the number of instructions being retired per clock cycle (or per "n" clock cycles). In an example embodiment, measurements may be obtained for each executing hardware thread and summed to derive a single collective instruction retiral rate. In other embodiments, instruction retiral rate measurements for one or or more individual threads could be evaluated. For example, the state machine 42 might be configured to measure only the instruction retiral rate of a highest priority hardware thread (as determined from the priority registers 40A). Note that the monitoring operations of block 58 may commence either prior to or after the wait period has elapsed in block 56. The former alternative could be used if a significant amount of time is needed for the performance monitor 38 to obtain reliable cache eviction and instruction retiral rate information.

In block 60, the state machine 42 compares the current cache eviction and instruction retiral rates against the reference cache eviction and instruction retiral rates respectively stored in reference registers 40C and 40D. Once these comparisons are made, the performance monitor 38 can be reset for use in making subsequent comparisons. If the cache eviction rate is greater than the cache eviction rate threshold in reference register 40C, the state machine 42 infers that the hardware threads could benefit from a larger cache footprint. If it is also the case that the instruction retiral rate is less than the instruction retiral rate threshold in reference register 40D, the state machine 42 infers that hardware thread competition for cache resources is slowing down overall hardware thread instruction execution throughput. Thus, in an example embodiment, if the cache eviction rate is above the threshold cache eviction rate stored in reference register 40C, and if the instruction retiral rate is below the instruction retiral rate threshold stored in reference register 40D, the state machine 42 proceeds to block 62 to implement hardware thread instruction fetch rate throttling. Otherwise, the state machine 42 proceeds to block 64 and cycles until a subsequent wait period as specified in wait period register 40G has elapsed. Following this wait period, the state machine's processing state returns to block 58.

Assuming block 62 is reached, the state machine 42 has determined that the CPU's SMT mode processing could benefit from instruction fetch rate throttling. The state machine 42 therefore consults the thread priority registers 40A to identify one or more lower priority hardware threads and then adjusts the multiplexer 26 to decrease the rate at which it fetches instructions for such threads. In an example embodiment, instruction fetch rate throttling entails throttling the one or more lower priority hardware threads to the point of preventing any of their instructions from entering the execution pipeline, thereby stalling the thread(s). This effectively shifts the CPU 4 out of SMT mode at the hardware level without any software overhead. In other embodiments, the instruction fetch rate might not be reduced to the point of stalling the lower priority thread(s), at least initially. Insofar as the CPU's resources are dynamically allocated, most of them will shift to the remaining unthrottled hardware thread(s). The multiplexer 26 will correspondingly increase the instruction fetch rate of such thread(s) and there will be a proportionate increase in the available cache footprint. As can also be seen in block 62, after the state machine 42 performs instruction fetch rate throttling, the CPU 4 continues hardware thread execution until the wait period specified in wait period register 40G has elapsed.

In block 66, the state machine 42 interacts with the performance monitor 38 to determine the current instruction retiral rate and compare it against the reference value stored in reference register 40E. This reference value represents an improved instruction retiral rate that the state machine 42 expects to see as a result of instruction fetch rate throttling. Once these comparisons are made, the performance monitor 38 can be reset for use in making subsequent comparisons. If the instruction retiral rate does not improve to the level indicated by reference register 40E, the state machine 42 may take responsive action. In an example embodiment, the responsive action that may be performed by the state machine 42 is to reset the AT mode state by unthrottling the lower priority thread(s) back to their original instruction fetch rate, and then return to block 56 to await another cycle count as specified by wait period register 40F before cycling through the algorithm again. In this embodiment, the state machine 42 concludes that increasing the effective cache footprint for the higher priority thread(s) was not useful, and the state machine will therefore reset the thread instruction execution rates so that all threads to proceed simultaneously. Other embodiments could potentially implement different actions. For example, if block 62 did not completely throttle the one or more lower priority threads to so as to completely stall them, the action performed by the state machine 42 in block 68 might be to further throttle such thread(s) to see if further improvement is obtained for the higher priority thread(s), and only then return to block 56 if the desired instruction retiral rate is not achieved.

If block 66 determines that the instruction retiral rate has improved to the desired level, the state machine 42 may loop back to block 62 and maintain the current instruction fetch rate throttling level. However, in an example embodiment, block 70 may be incorporated into this loop so that the CPU 4 can remove throttling (as per block 68) in the event of a context switch or an interrupt. Thus, if a stalled lower priority hardware thread receives an interrupt or switches context in order to perform system housekeeping work or run a new software thread, restoring the thread to its full instruction fetch rate will allow the required processing to be performed. Insofar as context switches occur randomly, and new software threads are scheduled, situations can arise when a high priority thread is executing in AT mode and a new software thread replaces one of the current threads. This has the effect of restarting the state machine from block 54, with a new cycle count interval being initiated. Both threads will then execute in SMT mode.

Figure 4:
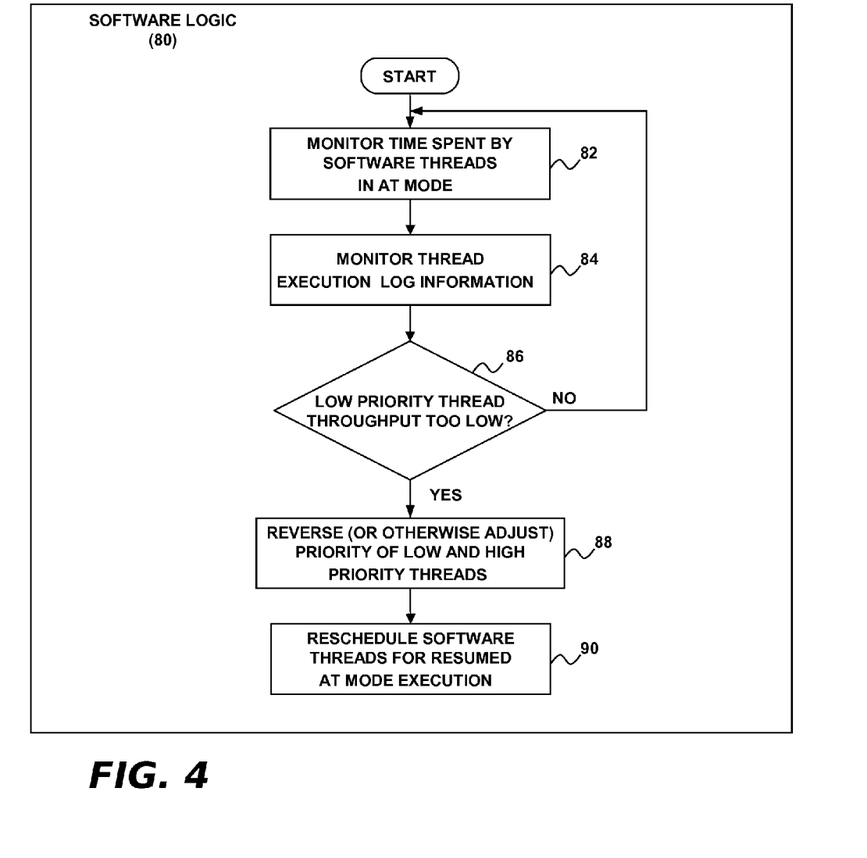
FIG. 4 is a flow diagram showing example software logic that may be implemented in response to the machine logic operations of FIG. 3.

As previously indicated, the state machine 42 may track the instruction execution throughput of all hardware threads during AT mode operations. In an example embodiment, this information may be logged to the logging registers 40B for use by an operating system, hypervisor or other thread scheduling entity for workload tuning. For example, FIG. 4 shows example software logic 80 that may perform such workload tuning. In blocks 82 and 84 the software logic 80 respectively monitors the amount of time that software threads spend in AT mode and their corresponding instruction execution throughput while in that mode (based on logging registers 40B). In block 86, if the software thread instruction execution throughput is acceptable, no workload tuning is required. However, block 86 may determine that the state machine 42 has throttled a lower priority thread in favor of a high priority thread to a point where the low priority thread has not made acceptable progress. In that case, the software logic can implement block 88 to reverse the thread priorities so that the low priority thread is assigned the priority of the high priority thread, and visa versa. Other priority adjustments could also be made besides merely reversing the thread priorities, especially if SMT modes above SMT-2 are being used. Thus, a generalized approach could be used in which the priority of a low priority thread is increased to some higher priority level and the priority of a high priority thread is decreased to some lower priority level. Following priority adjustment in block 88, the threads may be rescheduled in block 90. The AT mode monitoring operations performed by the software logic 80 may then be resumed or restarted, with the former being preferred so that the software logic 80 can develop long term trend data. The foregoing workload tuning will ensure that both threads get an equal opportunity to execute, thereby optimizing overall system throughput. This use of AT mode processing with alternating thread priorities would also be useful when the software threads have the same priority. Performance would be enhanced without any noticeable impact due to delaying each thread's execution.

Accordingly, a technique for has been disclosed for optimizing program instruction execution throughput by automatically altering thread co-execution based on operating system directives. It will be appreciated that the foregoing concepts may be variously embodied in any of a machine implemented method (including but not limited to CPU microcode operations), a CPU or other instruction processing device that may include circuit logic, instructions stored within a storage medium (code) that when executed by processing circuitry causes the circuitry to perform operations, or a combination of circuit logic and code, and a system such as a computer or other data processing machine or device. Aspects of the disclosed subject matter may also be implemented by a computer program product in which digitally encoded program instructions (including but not limited to a CPU microcode program) are stored on one or more computer-readable data storage media for use in controlling a CPU or other instruction processing device to perform operations. The program instructions may be comprise machine language code that is ready for loading and execution by the machine, or the program instructions may comprise a higher level language that can be assembled, compiled or interpreted into machine language. When implemented on a machine comprising a CPU or other instruction processing device, the program instructions control the CPU to provide a particular machine that operates analogously to specific logic circuits, which themselves could be used for the invention.

Example data storage media for storing program instructions of a computer program product include any storage media can store the program instructions. The media could be provided by read-only memory (ROM), random access memory (RAM) or other semiconductor or solid state memory of the type used in CPUs or otherwise within computers and data processing machines. The media could also be provided by portable magnetic, optical or magneto-optical media (such as floppy disks, flash memory sticks, etc.), or magnetic media combined with drive systems (e.g. disk drives). More broadly, the media could comprise any electronic, magnetic, optical, electromagnetic, infrared, semiconductor system or apparatus or device, transmission or propagation or signaling medium, or any other entity that can contain, store, communicate, propagate or transport the program instructions for use by or in connection with an instruction execution system, apparatus or device, such as a computer. For all of the above forms of media, when the program instructions are loaded into and executed by an instruction execution system, apparatus, device or circuitry, the resultant programmed system, apparatus, device or circuitry becomes a particular machine for practicing embodiments of the methods and systems as described herein.

The CPU 4, its performance monitor 38, its registers 40, its state machine 42, and any subcomponent thereof that is implemented according the present disclosure may be designed in various stages, from creation, to simulation, to test, to layout, to fabrication. Design structures processed and/or generated during this design flow may be encoded on machine-readable transmission or storage media to include data and/or instructions that when executed or otherwise processed on a data processing system generate a logically, structurally, mechanically, or otherwise functionally equivalent representation of hardware components, circuits, devices or systems. The design structures may be represented in various ways, including using a hardware description language (HDL) or another functional description language to simulate or otherwise functionally represent an electronic component, circuit, electronic or logic module, apparatus, device or system. The design structures will contain elements that when processed in a computer-aided design system generate a machine-executable representation of the electronic component, circuit, electronic or logic module, apparatus, device or system. Such elements may include, but are not limited to symbolic data, map files, test data files, design content files, manufacturing data, layout parameters, wires, levels of metal, vias, shapes, data for routing through a manufacturing line, and any other data required by a manufacturer or other designer/developer to produce an electronic component, circuit, electronic or logic module, apparatus, device or system.

Although various embodiments of the invention have been described, it should be apparent that many variations and alternative embodiments could be implemented in accordance with the present disclosure. It is understood, therefore, that the invention is not to be in any way limited except in accordance with the spirit of the appended claims and their equivalents.

What is claimed is:

1. A method for optimizing program instruction execution throughput in a processor apparatus having at least one central processing unit core (CPU), comprising:
    implementing a simultaneous multithreaded (SMT) operational mode in said CPU wherein program instructions associated with at least two software threads are executed in parallel as hardware threads while sharing a cache memory resource within said CPU;
    implementing an autothread (AT) operational mode in said CPU;
    determining as part of said AT operational mode (1) whether there is a resource conflict between said hardware threads, and (2) whether said resource conflict undermines instruction execution throughput; and
    if said determining detects a resource conflict that undermines instruction execution throughput, adjusting relative instruction execution rates of said hardware threads in said CPU based on relative priorities of said software threads specified to said processor apparatus by a software scheduling entity.

2. The method of claim 1, wherein said resource conflict determining comprises determining whether one or more of a cache eviction rate, a translation lookaside buffer eviction rate, or contention for functional execution units associated with said CPU exceeds a threshold, and whether an instruction retiral rate of said hardware threads is below an instruction retiral rate threshold.

3. The method of claim 1, wherein said resource conflict determining is performed periodically at a predetermined interval.

4. The method of claim 1, wherein said instruction execution rate adjusting comprises throttling an instruction fetch rate of one or more lower priority threads.

5. The method of claim 1, further including readjusting said relative instruction execution rates of said hardware threads in said CPU if said instruction execution rate adjusting does not improve an instruction retiral rate of one or more threads.

6. The method of claim 1, further including exiting said AT mode when said CPU is not executing in application thread context.

7. The method of claim 1, further including logging an amount of time said at least two software threads are allowed to execute for use in subsequent software scheduling of said software threads, said software scheduling including increasing a priority of a first software thread whose instruction execution throughput was decreased during AT mode processing and decreasing a priority of a second software thread whose instruction execution throughput was increased during AT mode processing.

* * * * *